May 2, 1939.  G. SLAYTER ET AL  2,156,316
APPARATUS FOR MAKING FIBROUS MATERIALS
Filed Oct. 31, 1934   2 Sheets-Sheet 1
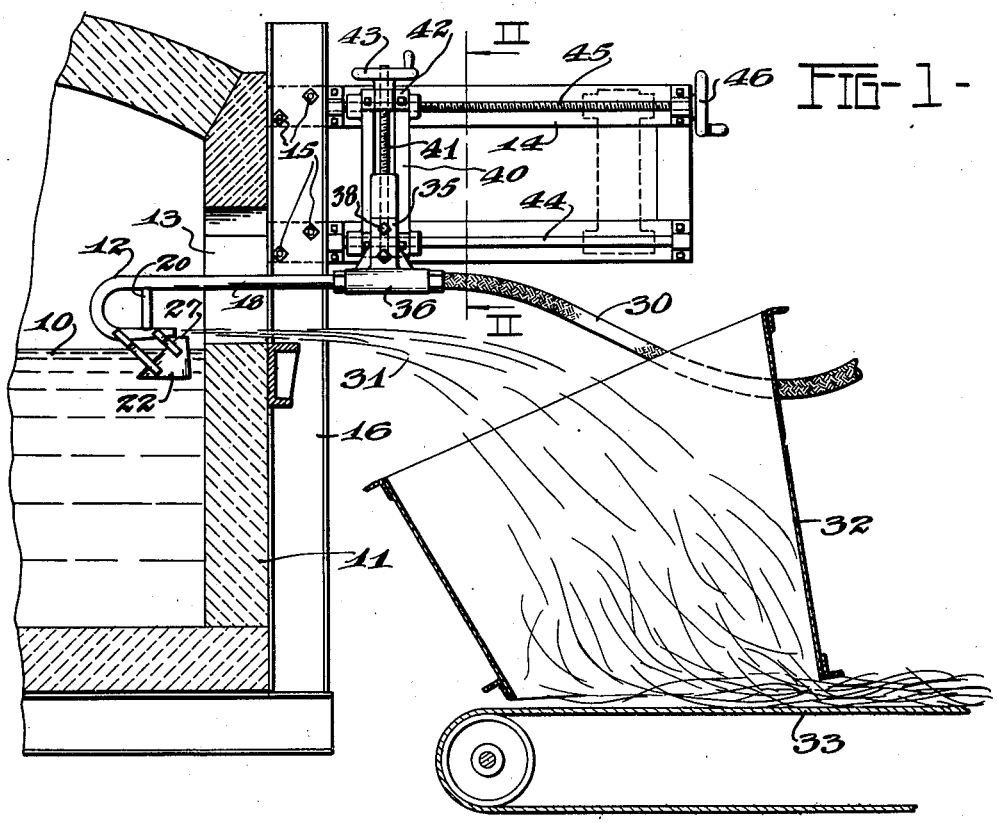
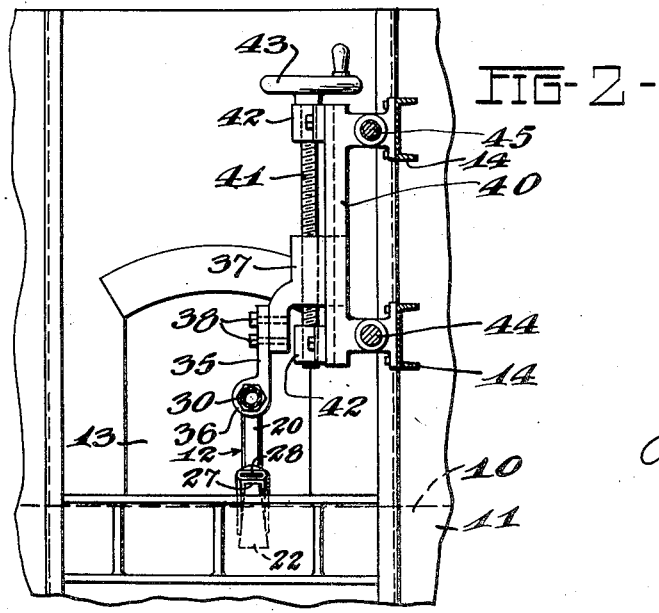
James Slayter and John H. Thomas
INVENTORS
BY J. F. Rule.
ATTORNEY.

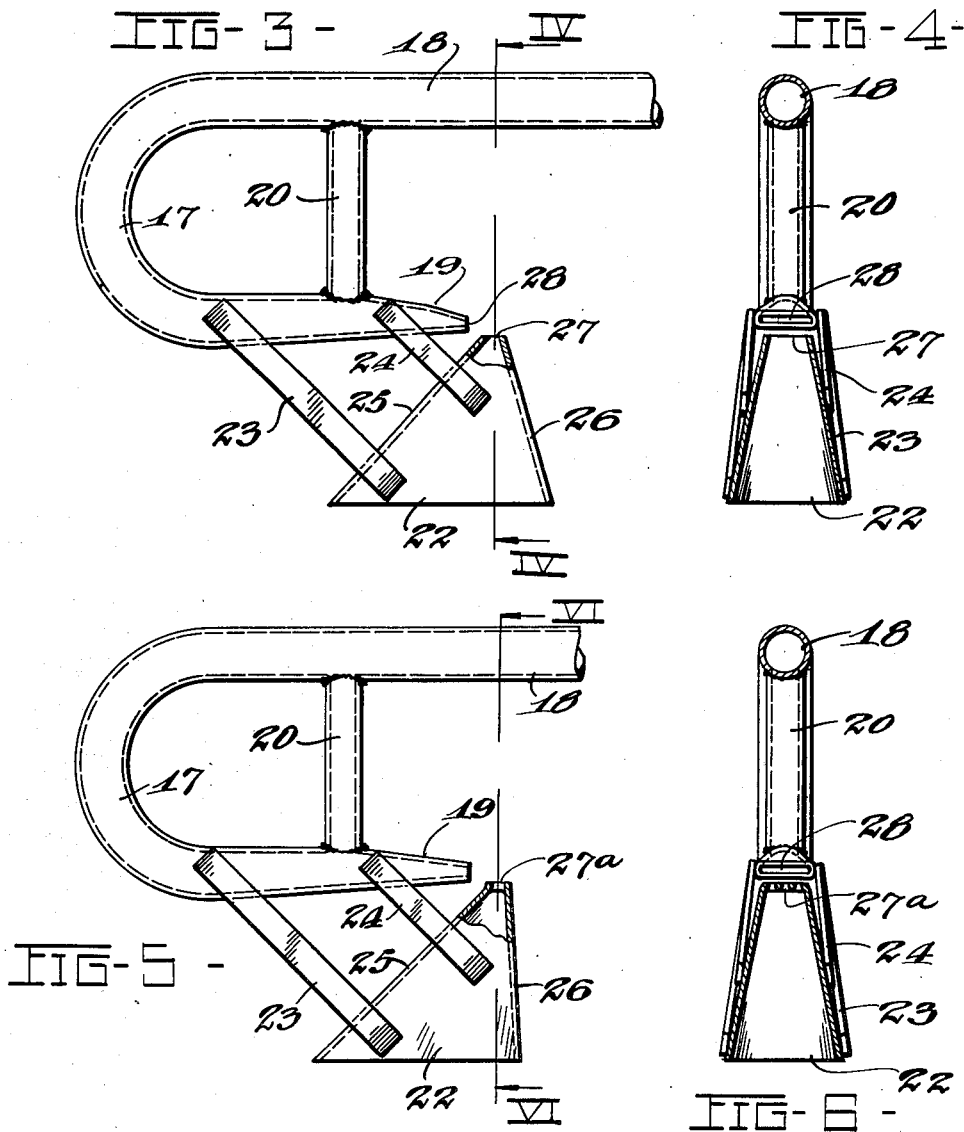

Patented May 2, 1939

2,156,316

UNITED STATES PATENT OFFICE 2,156,316

APPARATUS FOR MAKING FIBROUS MATERIALS

Games Slayter and John H. Thomas, Newark, Ohio, assignors, by mesne assignments, to Owens-Corning Fiberglas Corporation, a corporation of Delaware Application October 31, 1934, Serial No. 750,817

5 Claims. (Cl. 49—1)

The present invention relates to an apparatus for drawing material from a supply body of the material in a more or less liquid, semi-liquid, molten or viscous condition and reducing it to a filamentary or fibrous form by a combined siphoning and blowing process.

An object of the invention is to provide a practical and efficient apparatus by which a supply body of the material may be reduced to fine fibers or filaments which are accumulated in a loose mass. The apparatus is adapted for use with a wide variety of materials and in general for reducing to a fibrous condition, materials which in solution or when melted, assume a viscous condition which permits them to be drawn out to filamentary form and then congealed or solidified. The transformation of the drawn fibers from a viscous or plastic to a solid condition may be effected either by evaporation, cooling, or a combined drying and cooling action, depending on the materials used. Examples of such material are solutions of cellulose exanthate or viscose for the manufacture of artificial silk fibers, syrups or sugar solutions and other organic materials and compounds, and inorganic materials as glass, slag and the like, which may be in a molten condition.

The invention in its preferred form as herein illustrated is particularly adapted for siphoning molten glass or similar material from a molten supply body by the action of a blower which at the same time draws the material into the form of fine fibers which solidify and accumulate as they are formed.

A further object of the invention is to provide means by which the apparatus for siphoning and blowing the material is maintained in a heated zone and at a high temperature which will permit the material to be blown to a fine fibrous condition and which will prevent chilling and accumulation of the chilled material on the siphoning and blowing apparatus.

A further object of the invention is to provide a practical form of siphoning and blowing apparatus which can be made of any desired capacity within wide limits without interfering with the efficiency of operation.

Other objects of the invention will appear hereinafter.

Referring to the accompanying drawings:

Fig. 1 is a sectional elevation of an apparatus for manufacturing glass wool in accordance with our invention.

Fig. 2 is a sectional elevation at the line II—II on Fig. 1.

Fig. 3 is a part sectional side elevation on a larger scale of the siphoning and blowing apparatus.

Fig. 4 is a section at the line IV—IV on Fig. 3.

Fig. 5 is a view similar to Fig. 3, showing a modified construction.

Fig. 6 is a section at the line VI—VI on Fig. 5.

Referring to Fig. 1, a continuous supply of the material 10 to be acted upon, as, for example, molten glass or like material, is maintained in a container 11 herein shown as a furnace tank. A combined siphoning and blowing apparatus 12 projects into the furnace through an opening 13 in the front wall of the furnace and is supported on a frame 14 attached by means of bolts 15 to framework 16 which supports the furnace. The blower comprises a horizontally disposed pipe 18, the forward portion 17 of which is curved downwardly and back in the form of a U-shaped hook, the free end of which provides a nozzle 19 pointing outwardly in a substantially horizontal direction. A vertically disposed brace 20 unites the upper and lower arms of the U-shaped blower. Said brace prevents distortion of the blower, which would otherwise occur, owing to the wide temperature variations to which it is subjected. The brace 20, as shown, is tubular and forms a bypath or shunt for a portion of the steam or other gas which is supplied to the blower.

A feeder device in the form of a spout 22 is rigidly attached to the blower by means of rods or bars 23 and 24. The spout is formed with a comparatively long base and upwardly converging front and rear walls 25 and 26. These walls converge to a narrow slot 27 opening upwardly at the upper end of the spout. The slot or orifice 27 extends transversely of the blower and, as shown, is located just below and in front of the nozzle 19. Said nozzle also terminates in a narrow horizontal slot or outlet opening 28 adjacent to and parallel with the slot 27. The nozzle orifice 28 may be substantially coextensive with the slot 27 in the direction of its length, or may be of greater length than the slot 27.

The spout 22 is designed to be partially immersed in the molten glass in the tank. Air, steam or other gas under considerable pressure is supplied through a pipe 30 to the blower and issues from the nozzle in a ribbon-like blast which is blown in a horizontal direction over the outlet 27 of the spout 22. This blast creates a suction within the spout by which the molten glass is siphoned or drawn upwardly and caused to issue through the orifice 27. As the glass issues from the spout and enters the blast of gas, it is drawn out into fine fibers or filaments 31 by the force of the blast. These filaments are carried by the blast through the furnace outlet 13 and are immediately cooled and solidified by the surrounding atmosphere. They are directed into a hopper or spout 32 and accumulate in a loose fibrous mass on an endless conveyor 33 by which the accumulated material is carried away for further treatment.

The apparatus 12 including the blower and the spout 22 are preferably made of a metal or metals and/or alloy or alloys which will withstand the extremely high temperatures to which they are subjected. The spout 22 may be made of platinum, an alloy of platinum-rhodium, or other suitable metal or alloy adapted to withstand the high temperature and corrosive action of the molten glass in which it is immersed. The blower 18 may be made of the same material as the spout 22. However, the blower is not in contact with the molten glass, and owing to the continuous passage of comparatively cool air or other gas through the blower, it is not brought to the same high temperatures as the spout 22. It may be made, therefore, of other metals or materials such as wrought iron, copper, etc., which are somewhat less resistant to extremely high temperatures and to the corroding action of the molten glass.

The blower is carried on an arm or carrier 35 formed with a bearing sleeve 36 through which the blower pipe extends. The arm 35 is removably attached to a slide block 37 by means of bolts 38. The block 37 is mounted for up and down movement in vertical guideways formed in a carrier frame 40. The block 37 and parts carried thereby are adjustable up and down by means of a vertical screw shaft 41 journaled in bearings 42 at the upper and lower ends of the frame 40. The screw shaft 41 is rotatable by means of a hand wheel 43 and has a screw threaded connection with the block 37 so that rotation of the hand wheel will adjust the blower and siphon spout up and down. The frame 40 is mounted for horizontal movement on rods 44 and 45 on the frame 14. The upper rod 45 is provided with screw threads, has a screw threaded connection with the frame 40 and is journaled for rotation in the frame 14. A hand wheel 46 on the rod 45 permits rotation thereof for moving the frame 40 toward and from the furnace.

It will be seen that with the construction above described, the spout 22 may be adjusted vertically to any desired depth within the glass 10, by rotation of the hand wheel 43. It may also be raised out of the glass and then withdrawn from the furnace by rotating the hand wheel 46.

Figs. 5 and 6 illustrate a modification in which the outlet of the spout comprises a row of small openings 27ª instead of a continuous narrow slit. Said row of openings is arranged parallel with the orifice 28 in the blower nozzle and may be substantially coextensive in length therewith. The provision of a series of individual openings facilitates the effective dividing of the issuing glass into a plurality or multiplicity of fine streams, and the drawing of said streams into threads or filaments of uniform fineness.

It is found in practice that the provision of a nozzle having a narrow elongated orifice, and in combination therewith a correspondingly narrow elongated outlet in the spout 22, or a row of openings 27ª as described, is more effective in producing a uniformly fine product than the usual constructions in which a blast of gas operates upon a single stream of the molten material issuing from a circular outlet. Moreover, the present construction permits the capacity of the apparatus to be adjusted or varied to any desired extent within wide limits by a corresponding change in the length of the blower and feeder outlets, without destroying the proper balance between the rate of flow of the material and the force of the blast. Any attempt to vary the capacity by varying the size of a circular outlet orifice for the molten material either increases or decreases the rate of flow in a manner to interfere with the effective action of the blower.

Modifications may be resorted to within the spirit and scope of our invention.

We claim:

1. The combination of a furnace containing a supply body of molten material, said furnace having a lateral opening in a side wall thereof above the level of said material, a siphon spout within the furnace and partially immersed in said material, said spout having upwardly convergent walls terminating in an elongated outlet opening above the level of said material and many times narrower than the spout at its lower end, and a blower within said furnace having a discharge opening in the form of a narrow slot parallel with and substantially coextensive laterally with the outlet opening of the siphon spout, said blower being arranged to direct a blast of gas across said outlet opening in the spout and outwardly through said opening in the wall of the furnace, whereby the molten material is siphoned or drawn upwardly through said spout by the blast of gas and drawn by said blast into filaments or fibers which are carried through and beyond the opening in the furnace wall.

2. The combination of a furnace tank to contain a pool of molten material, said tank having an opening in a wall thereof, said opening being located above the level of said pool, a blower comprising a pipe extending into the tank through said opening and having its inner end portion bent or curved to a hook-shape, with the end of the pipe terminating in a nozzle having an outwardly directed orifice and a brace extending across said hook, and a spout connected to said blower in position to project downward into the molten material, said spout having an outlet through which the molten material is drawn upwardly by the force of a blast of gas from said blower.

3. The combination of a furnace tank to contain a pool of molten material, said tank having an opening in a wall thereof, said opening being located above the level of said pool, a blower comprising a pipe extending into the tank through said opening and having its inner end portion bent or curved to a hook-shape, with the end of the pipe terminating in a nozzle having an outwardly directed orifice and a brace extending across said hook, and a spout connected to said blower in position to project downward into the molten material, said spout having an outlet through which the molten material is drawn upwardly by the force of a blast of gas from said blower, said brace consisting of a tube forming a bypass through which a portion of the gas supplied to the blower is caused to flow.

4. The combination of a furnace tank to contain a pool of molten material, said tank having an opening in a wall thereof, said opening being located above the level of said pool, a blower comprising a pipe extending into the tank through said opening and having its inner end portion bent or curved to a hook-shape, with the end of the pipe terminating in a nozzle having an outwardly directed orifice and a brace extending across said hook, a spout connected to said blower in position to project downward into the molten material, said spout having an outlet through which the molten material is drawn upwardly by the force of a blast of gas from said blower, a carrier exterior to the furnace tank on which the blower is supported, and means for adjusting said carrier up and down and toward and from the furnace tank.

5. The combination of a furnace tank to contain a pool of molten material, said tank having an opening in a wall thereof, said opening being located above the level of said pool, a blower comprising a pipe extending into the tank through said opening and having its inner end portion bent or curved to a hook-shape, with the end of the pipe terminating in a nozzle having an outwardly directed orifice and a brace extending across said hook, a spout connected to said blower in position to project downward into the molten material, said spout having an outlet through which the molten material is drawn upwardly by the force of a blast of gas from said blower, a carrier, means for attaching the blower to said carrier, a frame on which the carrier is mounted, means for adjusting the carrier up and down on said frame for lifting and lowering the blower, and means for shifting said frame toward and from the furnace for projecting the blower into the furnace or withdrawing it therefrom.

GAMES SLAYTER.
JOHN H. THOMAS.